US008652376B2

(12) United States Patent
Burmeister (10) Patent No.: US 8,652,376 B2
(45) Date of Patent: Feb. 18, 2014

(54) PROCESS FOR PRODUCING NANOSTRUCTURED AND/OR MICROSTRUCTURED SURFACES IN AN ADHESIVE LAYER, MORE PARTICULARLY IN A SELF-ADHESIVE LAYER (75) Inventor: Axel Burmeister, Buchholz (DE)

(73) Assignee: tesa SE, Hamburg (DE)

( * ) Notice: Subject to any disclaimer, the term of this patent is extended or adjusted under 35 U.S.C. 154(b) by 345 days.

(21) Appl. No.: 12/033,908

(22) Filed: Feb. 20, 2008

(65) Prior Publication Data
US 2008/0199663 A1 Aug. 21, 2008

(51) Int. Cl.
B29C 43/46 (2006.01)

(52) U.S. Cl.
USPC .......................................................... 264/167

(58) Field of Classification Search
USPC .................. 264/172.19, 173.1, 175, 166–167
See application file for complete search history.

(56) References Cited

U.S. PATENT DOCUMENTS

| 5,650,215 | A | 7/1997 | Mazurek et al. | |
| 2003/0138624 | A1* | 7/2003 | Burmeister et al. | 428/343 |
| 2003/0187170 | A1* | 10/2003 | Burmeister | 526/307.8 |
| 2006/0037692 | A1* | 2/2006 | Haskett et al. | 156/230 |
| 2006/0147636 | A1* | 7/2006 | Cooprider et al. | 427/355 |

FOREIGN PATENT DOCUMENTS

| DE | 39 06 872 | | 9/1990 |
| DE | 43 13 008 C1 | | 11/1994 |
| DE | 693 17 890 | | 9/1998 |
| DE | 694 22 057 | | 7/2000 |
| DE | 101 58 347 A1 | | 6/2003 |
| DE | 102 10 990 A1 | | 10/2003 |
| DE | 694 32 560 | | 2/2004 |
| EP | 0 578 151 A1 | | 1/1994 |
| EP | 0 621 326 A1 | | 10/1994 |
| WO | 94 28079 | | 12/1994 |
| WO | 96 04123 A1 | | 2/1996 |
| WO | 97 18276 A1 | | 5/1997 |
| WO | 03 035371 | | 5/2003 |

* cited by examiner

Primary Examiner — Larry Thrower
Assistant Examiner — Xue Liu
(74) Attorney, Agent, or Firm — Norris McLaughlin & Marcus, P.A.

(57) ABSTRACT

The invention relates to a process for producing nanostructured and/or microstructured surfaces in an adhesive layer, more particularly in a self-adhesive layer, in which an adhesive polymer mixture, more particularly a self-adhesive polymer mixture, is guided into a nip formed by a relief roll, whose surface has been provided with a relief which represents the negative of the surface structure to be produced on the adhesive layer, and by a nip roll, and where the relief roll and the nip roll rotate in opposite directions, wrapped partly around the relief roll is a web-form carrier material which is guided through the nip and whose speed corresponds more particularly to the peripheral speed of the relief roll, the adhesive polymer mixture, more particularly the self-adhesive polymer mixture, is pressed through the nip, so that the near-roll surface of the polymer mixture is shaped in accordance with the relief, lies in layer form on the carrier material after passage through the nip, and is guided away with the carrier material.

15 Claims, 5 Drawing Sheets

PROCESS FOR PRODUCING NANOSTRUCTURED AND/OR MICROSTRUCTURED SURFACES IN AN ADHESIVE LAYER, MORE PARTICULARLY IN A SELF-ADHESIVE LAYER

The invention relates to a process for producing nanostructured and microstructured surfaces in an adhesive layer, more particularly in a self-adhesive layer.

Surfaces having structures with sizes in the range from 10 nanometers up to 100 micrometers represent solutions to problems in a very wide variety of spheres.

In the case of optical components, microstructures are able to split light and guide it in desired directions. Prism-structured films can be used as retroreflectors, for roadway markings or on traffic signs.

Non-optical applications of microstructured surfaces are self-cleaning surfaces (lotus effect WO 96/04123 A1), artificial sharkskin (streamlining) and abrasive papers.

In addition to the processes for producing master structures that are known from WO 96/04123 A1, mention may be made, by way of example, of lithography, including greyscale lithography, micromilling and microcutting, laser ablation, etching, and sandblasting.

Another widespread process is the subsequent replication and reformation of master structures by means of electroplating in order to produce a form tool, for example, the LIGA process.

These form tools are then used as a starting point for further impressions in polymers in large numbers of units.

For producing large numbers of units, therefore, there are essentially four processes.

1. Injection Molding

In this case a melted polymer is injected under high pressure into a form tool (mold) provided with a microstructure, so that the negative of the mold and the structure is formed in the polymer. After the polymer melt has solidified within the injection mold, the mold is opened and the microstructured polymer is removed from the mold. This process is used, among other things, for producing audio CDs. The disadvantage of injection molding is that only small areas can be produced in this way.

2. Radiation-Crosslinking Polymers a) A support with a radiation-crosslinkable polymer is shaped by means of a transparent, structured die or a roll, then crosslinked by means of radiation through the die or through the roll. After crosslinking, the tool is removed again.

b) A transparent support with a radiation-crosslinkable polymer is shaped by means of a structured die or a roll, then crosslinked by means of radiation through the support. After crosslinking, the tool is removed again.

This process is described by way of example for electron beams and UV radiation in the 2001 conference proceedings of the RadTech Europe Conference and Exhibition, in the paper by Prof. Mehnert of October 2001 on pages 603 to 608. Disadvantages of the radiation-crosslinking polymers are regarded as being that the selection of raw materials is restricted, the raw materials are in any case expensive, and filled colored polymer mixtures are possible only with severe restrictions.

3. Die Embossing

A thermoplastic polymer is embossed under high temperature and pressure using a structured metal die; after impression, the workpiece is cooled (to below the glass transition point) in order that the replicated structure is not destroyed when the die is withdrawn. Subsequently, when using a polymer in web form, the operation can be repeated directly adjacently.

Advantageous features of die embossing include the fact that the process is highly suitable for replicating complex structures such as lenses and prisms and the fact that at the same time it is possible to achieve a very high quality of impression.

On the other hand, die embossing is a very time-consuming operation, a high level of tool wear is observed, a very severely pronounced seam is formed between two replicas, and it is necessary to operate a high level of mechanical complexity, owing to the need for the tools to be in a planar position.

4. Rotary Embossing

A thermoplastic polymer in web form is embossed by means of a structured metal roll under high temperature and very high pressure. Following impression, the polymer can be cooled (to below the glass transition point) in order that the replicated structure is not destroyed when the die is withdrawn.

Here again there are a number of advantages and disadvantages. Very high operating speeds are achieved. Moreover, a structuring results which is virtually seamless and which is particularly suitable for replicating diffraction gratings and/or holograms.

However, the process of rotary embossing is suitable only for polymers possessing great mechanical and thermal stability (PET). As in the case of die embossing, it is necessary to operate a very high level of mechanical complexity, under high pressure, because of the need for an absolutely planar position, and this makes it particularly difficult to scale up the process to large operating widths. Finally, rotary embossing is poorly suited to the impression of complex structures, lenses or prisms for example, or very high structures.

For producing microstructures in pressure-sensitive adhesives there are a variety of approaches: According to the U.S. Pat. No. 5,650,215 family there are essentially two different processes presented. Firstly, the structures are modeled from structured rolls into the adhesive. The disadvantage of this process is that the adhesive contaminates the tool and/or is deformed on removal. Secondly, a structured carrier is treated with the self-adhesive composition, its structure being transferred to the self-adhesive composition.

According to WO 97/18276 A1 the structures in the adhesive are produced by filling with microbeads or microballoons. A disadvantage with this process is that the form and size of the structures are not freely selectable.

DE 101 58 347 A1 discloses a process for producing nanostructured and microstructured polymer films in which a polymer is guided into a gap formed by a roll and a means which develops an opposing pressure. The polymer is pressed through the gap, so that after the gap the polymer lies in the form of a film on the roll. Wrapped around the roll is a form tool which is provided with a relief that represents the negative of the surface structure to be produced on the polymer film, so that the near-roll surface of the polymer film is shaped in accordance with the relief. The means is configured as a doctor blade or backing roll. The process disclosed therein is limited to the impression of the reliefs in films.

DE 102 10 990 A1 discloses a process for producing a coated transparent polymeric film which carries an image that serves, for example, as a security feature. This is achieved by locally varying the thickness of a layer applied to the polymeric film, in order to represent an image. The layer may be composed of a polymer-containing self-adhesive composition, so that the coated transparent polymeric film can be adhered to a substrate. The film is produced using a two-roll coating unit in which one of the two rolls is fixed. This means that only compositions with low viscosities can be processed by the process described. Moreover, the fixed roll limits the width of the web that can be produced (to a maximum of 400 mm). Since the carrier on to which the adhesive is coated runs simultaneously through the roll nip, the fixed roll and the resulting shearing forces mean that only very stable carriers can be processed, such as thick films, wovens or nonwovens. Sensitive carriers such as paper are torn.

It is an object of the invention to provide a process which makes it possible to create nanostructures and/or microstructures on surfaces of self-adhesive layers, while at the same time being technically uncomplicated. The process ought further to allow rapid manufacture, should enable high, complex structures to be impressed almost seamlessly, should feature an acceptable level of effort when scaling up the operating widths, and, finally, should allow the use even of sensitive carriers.

This object is achieved by a process as described hereinbelow.

The invention accordingly provides a process for producing nanostructured and/or microstructured surfaces in an adhesive layer, more particularly in a self-adhesive layer, in which an adhesive polymer mixture, more particularly a self-adhesive polymer mixture, is guided into a nip formed by a relief roll, whose surface has been provided with a relief which represents the negative of the surface structure to be produced on the adhesive layer, and by a nip roll. Wrapped partly around the relief roll is a web-form carrier material which is guided through the nip and whose speed corresponds more particularly to the peripheral speed of the relief roll. The relief roll and the nip roll rotate in opposite directions. The peripheral speed of the nip roll, according to one preferred embodiment of the invention, is more than 70% of the peripheral speed of the relief roll. With particular preference the relief roll and the nip roll rotate with the same peripheral speed. The adhesive polymer mixture, more particularly the self-adhesive polymer mixture, is pressed through the nip, so that the near-roll surface of the polymer mixture is shaped in accordance with the relief, without the adhesive polymer mixture, more particularly self-adhesive polymer mixture, coming into contact with the relief, lies in layer form on the carrier material after passage through the nip, and is guided away with the carrier material.

Preference is given to self-adhesive polymer mixtures, although the process of the invention can also be used with polymer mixtures which have adhesive properties. When reference is made below to self-adhesive polymers or polymer mixtures, the skilled worker recognizes no automatic restriction on the concept of the invention, but instead automatically reads other adhesive mixtures as being included.

In one advantageous embodiment a feed roll forms a further nip with the nip roll; the feed roll and the nip roll preferably rotating with the same peripheral speed. The self-adhesive polymer mixture is first applied to the feed roll, guided into the further nip and, remaining on the feed roll after passing through the nip, is guided into the nip between the relief roll and the nip roll.

The polymer mixture can be applied to the nip roll and/or to the feed roll, preferably using a die.

It is very favorable in the sense of the invention for the rolls to be heated, more particularly to a temperature above the melting point of the polymer used, or to be cooled.

With further preference the relief and/or the nanostructure and/or microstructure are produced in the surface of the relief roll by means of sandblasting, etching, laser ablation, lithographic techniques, offset printing, electroplating processes, LIGA, and/or erosion. Further preferably the relief roll may also be composed of a roll with a form tool wrapped around it.

Offset printing, developed from lithography, is an indirect printing process in which printing takes place not directly onto the form tool but instead first from the print carrier (which reads correctly) onto a cylinder provided with a rubber cloth (with the image now inverted), which in turn transfers the printed image the right way round onto the form tool. Since offset printing is a planographic printing process, printing and non-printing parts lie in one plane. The former are treated for oleophilicity, so that they take up printing ink while repelling water; in the non-printing parts of the print carrier, the opposite is the case.

By galvanotechnics in the narrower sense is meant the electrochemical surface treatment of materials, i.e. the electrolytic deposition of thin metallic (or, less commonly, non-metallic) layers for the purpose of beautification, corrosion protection, the production of composite materials with enhanced properties, and the like. The two main fields embraced by galvanotechnics are electroplating and electroforming. Electroforming is used to produce or reproduce articles by electrolytic deposition. First of all an impression (negative, hollow mold) is taken of the original in plaster, wax, gutta-percha, silicone rubber, low-melting metal alloy, exposed and patterned photoresist, etc. The surface of the casting is made electrically conducting (by chemical deposition or vapor deposition of metals) and then, as the minus terminal, is coated with the metal to be deposited (for example Cu, Ni, Ag etc.; plus terminal) in the galvanizing liquid. When electrolysis is over, the layer of metal formed can be lifted from the mold.

Erosion describes a process in manufacturing in which a desired workpiece shape is obtained by controlled extraction of particles of material from the surface of the workpiece as a consequence of electrical spark discharges.

LIGA describes a combination of lithography with synchrotron radiation, galvanoforming and impression, in order to produce microstructures for electronic circuits. The advantage of the process lies in the ability to manufacture these microstructures with structure heights ranging from several hundred micrometers down to very small lateral dimensions in the nanometer range.

The structure depth of the counter relief produced in the self-adhesive layer is with further preference between 1 µm and 3000 µm and the structure width is between 0.5 µm and 10 cm. A particular advantage of the process of the invention is that structures of a very wide variety of dimensions can be present immediately alongside one another in the relief and yet can still be modeled in good quality.

The intention of the text below is to specify, by way of example, what processes can be used to produce what structures for the relief roll.

As structures, the relief may carry diffraction gratings having grid constants of from 1600 nm to 2100 nm with a depth of approximately 1000 nm. The diffraction gratings are arranged so that when irradiated with white light they produce an indicium with different colors. The structures are produced by mask exposure in a positive photoresist and subsequent removal of the unexposed regions on an Si wafer. Subsequently and additionally, these structures are vapor-deposited with about 100 nm of nickel in order to render them conductive, and finally are electroplated with nickel to a total thickness of 50 µm.

Greyscale lithography can be used to produce prisms having an edge length of 10 µm and a height of 7.5 µm. The process is essentially the same as that described above, except that exposure is carried out using a greyscale mask.

A laser is used to provide a polyester film with a holographic topography which repeats continuously on the film, giving a "scatter print".

In a brass blank, a diamond is used to cut so-called V-grooves with a depth of 20 µm.

In the process of the invention the polymer mixture to be structured is advantageously present, during shaping, in a completely softened form or in a melt form, and forms a rotating bead in the roll nip that forms between relief roll and nip roll. The rotating bead offers considerable advantages. On the one hand, the rotating bead transports bubble-like air inclusions from the roll nip to the surface of the bead, and on the other hand it ensures uniform wetting of the form tool, even when structures differing greatly in design and height are to be modeled immediately adjacent to one another.

In a further advantageous embodiment of the process, after passage through the nip, the self-adhesive layer is taken from the carrier material and transferred to a second carrier. In this way the structured surface of the self-adhesive layer is exposed on the second carrier. This version is outstandingly suitable, owing to the low stress on the carrier, for applying the nanostructured and/or microstructured self-adhesive layer to sensitive, plasticized films or to open woven fabrics with a propensity for strikethrough of the adhesive. With further preference the carrier material in this case is an inherently impervious strip.

In addition it is possible for the carrier material and/or the second carrier to be a film (made for example of PU, PE or PP, PET, PA), a nonwoven, a woven, a foam, a metallized film, a composite, a multi-layer laminate, a foamed film or a paper.

Preferably, use is made of a thermoplastic polyolefin film which is unoriented and includes at least one polyolefin from the group of the polyethylenes (for example HDPE, LDPE, MDPE, LLDPE, VLLDPE, copolymers of ethylene with polar comonomers) and the group of polypropylenes (for example, polypropylene homopolymers, random polypropylene copolymers or block polypropylene copolymers). It is preferred to use mixtures of different suitable polyolefins.

Outstandingly in accordance with the invention it is possible to use, as films, monoaxially and biaxially oriented films based on polyolefins, more particularly films based on oriented polyethylene or oriented copolymers containing ethylene units and/or polypropylene units.

Another suitable example is a metallocene-polyethylene nonwoven.

As support or carrier material it is possible to use all known textile carriers such as loop goods, wovens, knits, or nonwoven webs; the term "web" embraces at least textile sheet-like structures in accordance with EN 29092 (1988) and also stitchbonded nonwovens and similar systems.

It is likewise possible to use spacer fabrics, including wovens and knits, with lamination. Spacer fabrics are matlike layer structures comprising a cover layer of a fiber or filament fleece, an underlayer and individual retaining fibers or bundles of such fibers between these layers, said fibers being distributed over the area of the layer structure, being needled through the particle layer, and joining the cover layer and the underlayer to one another. The retaining fibers needled through the particle layer hold the cover layer and the underlayer at a distance from one another and are joined to the cover layer and the underlayer.

Suitable nonwovens include, in particular, consolidated staple fiber webs, but also filament webs, meltblown webs, and spunbonded webs, which generally require additional consolidation. Known, possible consolidation methods for webs are mechanical, thermal, and chemical consolidation. Whereas with mechanical consolidations the fibers are usually held together purely mechanically by entanglement of the individual fibers, by the interlooping of fiber bundles or by the stitching-in of additional threads, it is possible by thermal and by chemical techniques to obtain adhesive (with binder) or cohesive (binderless) fiber-fiber bonds. Given appropriate formulation and an appropriate process regime, these bonds may be restricted exclusively, or at least predominantly, to the fiber nodal points, so that a stable, three-dimensional network is formed while retaining the loose open structure in the web.

Webs which have proven particularly advantageous are those consolidated in particular by overstitching with separate threads or by interlooping.

Consolidated webs of this kind are produced, for example, on stitchbonding machines of the "Malifleece" type from the company Karl Mayer, formerly Malimo, and can be obtained, inter alia, from the companies Naue Fasertechnik and Techtex GmbH. A Malifleece is characterized in that a cross-laid web is consolidated by the formation of loops from fibers of the web. The carrier used may also be a web of the Kunit or Multiknit type. A Kunit web is characterized in that it originates from the processing of a longitudinally oriented fiber web to form a sheetlike structure which has the heads and legs of loops on one side and, on the other, loop feet or pile fiber folds, but possesses neither threads nor prefabricated sheet-like structures. A web of this kind has been produced, inter alia, for many years, for example on stitchbonding machines of the "Kunitvlies" type from the company Karl Mayer. A further characterizing feature of this web is that, as a longitudinal-fiber web, it is able to absorb high tensile forces in the longitudinal direction. The characteristic feature of a Multiknit web relative to the Kunit is that the web is consolidated on both the top and bottom sides by virtue of the double-sided needle punching. Finally, stitchbonded webs are also suitable as an intermediate for forming an adhesive tape of the invention. A stitchbonded web is formed from a nonwoven material having a large number of stitches extending parallel to one another. These stitches are brought about by the incorporation, by stitching or knitting, of continuous textile threads. For this type of web, stitchbonding machines of the "Maliwatt" type from the company Karl Mayer, formerly Malimo, are known. The Caliweb® is then outstandingly suitable. The Caliweb® is composed of a thermally fixed Multiknit spacer nonwoven having two external loop layers and an internal pile layer, which are arranged perpendicularly with respect to the loop layers.

Also particularly advantageous is a staple fiber web which is mechanically preconsolidated in the first step or is a wet-laid web laid hydrodynamically, in which between 2% and 50% of the web fibers are fusible fibers, in particular between 5% and 40% of the fibers of the web.

A web of this kind is characterized in that the fibers are laid wet or, for example, a staple fiber web is preconsolidated by the formation of loops from web fibers or by needling, stitching or air-jet and/or water-jet treatment. In a second step, thermofixing takes place, with the strength of the web being increased again by the (partial) melting of the fusible fibers. The web carrier may also be consolidated without binders, by means for example of hot embossing with structured rolls, with properties such as strength, thickness, density, flexibility, and the like being controllable via the pressure, temperature, residence time, and embossing geometry.

For the use of nonwovens in accordance with the invention, the adhesive consolidation of mechanically preconsolidated or wet-laid webs is of particular interest, it being possible for said consolidation to take place by way of the addition of binder in solid, liquid, foamed or paste-like form. A great diversity of theoretical embodiments is possible: for example, solid binders as powders for trickling in, as a sheet or as a mesh, or in the form of binding fibers. Liquid binders may be applied as solutions in water or organic solvent or as a dispersion. For adhesive consolidation, binder dispersions are predominantly chosen: thermosets in the form of phenolic or melamine resin dispersions, elastomers as dispersions of natural or synthetic rubbers, or, usually, dispersions of thermoplastics such as acrylates, vinyl acetates, polyurethanes, styrene-butadiene systems, PVC, and the like, and also copolymers thereof. Normally, the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated webs which already possess sufficient composite strength, the single-sided spray application of a binder is appropriate for effecting specific changes in the surface properties. Such a procedure not only is sparing in its use of binder but also greatly reduces the energy requirement for drying. Since no squeeze rolls are required and the dispersions remain predominantly in the upper region of the web material, unwanted hardening and stiffening of the web can very largely be avoided.

For sufficient adhesive consolidation of the web carrier, the addition of binder in the order of magnitude of from 1% to 50%, in particular from 3% to 20%, based on the weight of fiber web, is generally required. The binder may be added as early as during the manufacture of the web, in the course of mechanical preconsolidation, or else in a separate process step, which may be carried out in-line or off-line. Following the addition of the binder it is necessary temporarily to generate a condition in which the binder becomes adhesive and adhesively connects the fibers—this may be achieved during the drying, for example, of dispersions, or else by heating, with further possibilities for variation existing by way of areal or partial application of pressure. The binder may be activated in known drying tunnels, or else, given an appropriate selection of binder, by means of infrared radiation, UV radiation, ultrasound, high-frequency radiation or the like. For the subsequent end use it is sensible, although not absolutely necessary, for the binder to have lost its tack following the end of the web production process.

A further, special form of adhesive consolidation consists in activating the binder by incipient dissolution or swelling. In this case it is also possible in principle for the fibers themselves, or admixed special fibers, to take over the function of the binder. Since, however, such solvents are objectionable on environmental grounds, and/or are problematic in their handling, for the majority of polymeric fibers, this process is not often employed.

Knitted fabrics are produced from one or more threads or thread systems by intermeshing (interlooping), in contrast to woven fabrics, which are produced by intersecting two thread systems (warp and weft threads), and nonwovens (bonded fiber fabrics), where a loose fiber web is consolidated by heat, needling or stitching or by means of water jets.

Knitted fabrics can be divided into weft knits, in which the threads run in transverse direction through the textile, and warp knits, where the threads run lengthwise through the textile. As a result of their mesh structure, knitted fabrics are fundamentally pliant, conforming textiles, since the meshes are able to stretch lengthways and widthways, and have a tendency to return to their original position. In high-grade material, they are very robust.

Starting materials envisaged for the textile carrier include more particularly polyester, polypropylene, viscose or cotton fibers. The present invention, however, is not restricted to the materials stated; rather it is possible to use a large number of other fibers to produce the web. In particular, wear-resistant polymers are used, such as polyesters, polyolefins, polyamides or glass fibers or carbon fibers.

One particular embodiment of the carrier further consists in the use of a paper or a film, which has been given an anti-adhesive treatment.

By way of example, it is possible to use a paper carrier having a density of from 1.1 to 1.25 g/cm$^3$, the paper carrier having essentially one top side and one bottom side.

On the top and/or bottom side(s), the paper carrier has been provided with a plastics coating, and on at least one of the two plastics coatings which may be present an anti-adhesive layer has been applied. In a further advantageous embodiment, the paper carrier is a highly densified glassine paper provided on the top and bottom sides with a plastics coating, with an anti-adhesive layer, in particular a silicone coating, having been applied to both plastics coatings. Furthermore, one outstanding embodiment exists when silicone, paraffin, Teflon or waxes, for example, are used as anti-adhesive layers. In that case it is possible to employ silicone-free release layers, for example, "non Silicone" from Rexam, or low-silicone release layers, for example "Lo ex" from Rexam.

Depending on the release material of the invention that is used in the specific case, it is possible to configure the anti-adhesive layers on both sides of the release material to have the same or different release effect, i.e., to set different release properties on either side (controlled release).

As adhesives for forming the self-adhesive layer it is possible to use substantially all polymers that are suitable as adhesives. The principal polymer of the polymer mixture is preferably from the group of non-thermoplastic elastomers, thermoplastic elastomers or thermoplasts or represents a blend of the stated polymers. Furthermore, advantageously, the polymer mixture at processing temperature is in softened or melted form. A suitable adhesive composition is one based on acrylic hotmelt, having a K value of at least 20, in particular more than 30 (measured in each case in 1% strength by weight solution in toluene at 25° C.), obtainable by concentrating a solution of such a composition to give a system which can be processed as a hotmelt. Concentrating may take place in appropriately equipped vessels or extruders; particularly in the case of accompanying devolatilization, a devolatilizing extruder is preferred. An adhesive of this kind is set out in DE 43 13 008 C2. In an intermediate step, the solvent is removed completely from the acrylate compositions prepared in this way.

The K value is determined in particular in analogy to DIN 53 726.

In addition, further volatile constituents are removed. After coating from the melt, these compositions contain only small fractions of volatile constituents. Accordingly, it is possible to adopt all of the monomers/formulations claimed in the above-cited patent. A further advantage of the compositions described in the patent is that they have a high K value and thus a high molecular weight. The skilled worker is aware that systems with higher molecular weights may be crosslinked more efficiently. Accordingly, there is a corresponding reduction in the fraction of volatile constituents.

The solution of the composition may contain from 5% to 80% by weight, in particular from 30% to 70% by weight, of solvent.

It is preferred to use commercially customary solvents, especially low-boiling hydrocarbons, ketones, alcohols and/or esters.

Preference is further given to using single-screw, twin-screw or multiscrew extruders having one or, in particular, two or more devolatilizing units.

The adhesive based on acrylic hotmelt may contain copolymerized benzoin derivatives, such as benzoin acrylate or benzoin methacrylate, for example, acrylates or methacrylates. Benzoin derivatives of this kind are described in EP 0 578 151 A.

The adhesive based on acrylic hotmelt may be UV-crosslinked. Other types of crosslinking, however, are also possible, an example being electron beam crosslinking.

In one further preferred embodiment, self-adhesive compositions used comprise copolymers of (meth)acrylic acid and esters thereof having 1 to 25 C atoms, maleic, fumaric and/or itaconic acid and/or esters thereof, substituted (meth)acrylamides, maleic anhydride, and other vinyl compounds, such as vinyl esters, especially vinyl acetate, vinyl alcohols and/or vinyl ethers.

The residual solvent content should be below 1% by weight.

It is also possible to use an adhesive from the group of the natural rubbers or the synthetic rubbers or any desired blend of natural and/or synthetic rubbers, the natural rubber or rubbers being selectable in principle from all available grades such as, for example, crepe, RSS, ADS, TSR or CV grades, depending on required purity and viscosity, and the synthetic rubber or rubbers being selectable from the group of randomly copolymerized styrene-butadiene rubbers (SBR), butadiene rubbers (BR), synthetic polyisoprenes (IR), butyl rubbers (IIR), halogenated butyl rubbers (XIIR), acrylic rubbers (ACM), ethylene-vinyl acetate (EVA) copolymers and polyurethanes and/or blends thereof.

Furthermore, and preferably, the rubbers may be admixed with thermoplastic elastomers with a weight fraction of from 10% to 50% by weight, based on the total elastomer fraction.

As representatives, mention may be made at this point, in particular, of the particularly compatible styrene-isoprene-styrene (SIS) and styrene-butadiene-styrene (SBS) types.

As tackifying resins it is possible without exception to use all known tackifier resins which have been described in the literature. Representatives that may be mentioned include the rosins, their disproportionated, hydrogenated, polymerized, esterified derivatives and salts, the aliphatic and aromatic hydrocarbon resins, terpene resins, and terpene-phenolic resins. Any desired combinations of these and other resins may be used in order to adjust the properties of the resulting adhesive in accordance with what is desired. Explicit reference is made to the depiction of the state of the art in the "Handbook of Pressure Sensitive Adhesive Technology" by Donatas Satas (van Nostrand, 1989).

Plasticizers which can be used are all plasticizing substances known from adhesive tape technology. They include, inter alia, the paraffinic and naphthenic oils, (functionalized) oligomers such as oligobutadienes and oligoisoprenes, liquid nitrile rubbers, liquid terpene resins, animal and vegetable oils and fats, phthalates, and functionalized acrylates.

For the purpose of heat-induced chemical crosslinking, it is possible to use all known heat-activatable chemical crosslinkers such as accelerated sulfur or sulfur donor systems, isocyanate systems, reactive melamine resins, formaldehyde resins, and (optionally halogenated) phenol-formaldehyde resins and/or reactive phenolic resin or diisocyanate crosslinking systems with the corresponding activators, epoxidized polyester resins and acrylic resins, and combinations thereof. The crosslinkers are preferably activated at temperatures above 50° C., in particular at temperatures from 100° C. to 160° C., with very particular preference at temperatures from 110° C. to 140° C. The thermal excitation of the crosslinkers may also be effected by means of IR rays or other high-energy electromagnetic alternating fields.

The polymer mixture is preferably blended with colorants such as $TiO_2$ or carbon black and/or with fillers such as chalk.

Furthermore, the self-adhesive composition may be filled with microballoons.

Microballoons are elastic, thermoplastic hollow spheres which have a polymer shell. These spheres are filled with low-boiling liquids or with liquefied gas. Suitable polymers for the shell are, more particularly acrylonitrile, PVDC, PVC or acrylates. Suitable low-boiling liquids include hydrocarbons such as the lower alkanes, pentane for example, while suitable liquefied gases include chemicals such as isobutane. The action of heat has the effect on the one hand of evaporating the liquid within the microballoons, and on the other hand of softening the outer polymer shell. Consequently, the capsules undergo irreversible extension and three-dimensional expansion. Expansion is at an end when the internal pressure and the external pressure compensate one another. In this way a closed-celled foam is obtained. According to one preferred embodiment of the invention the fraction of expanded microballoons in the adhesive is between greater than 0% by weight and 20% by weight, more particularly between 1.5% by weight and 10% by weight. With further preference the microballoons at 25° C. have a diameter of 3 µm to 40 µm, more particularly 5 µm to 20 µm, and/or after temperature exposure have a diameter of 20 µm to 200 µm, more particularly 40 µm to 100 µm.

Further embraced by the concept of the invention is a self-adhesive layer which is produced in accordance with the process of the invention.

The relief roll has a surface with a relief, the structure depth of the relief being smaller than the thickness of the web-form carrier material which wraps partly around the relief roll. Surprisingly, with the process of the invention as described herein, the structures are modeled in the adhesive polymer mixture, in other words transferred from the relief roll by the carrier material to the polymer, despite the fact that the structure depth can be very much smaller than the thickness of the carrier material between relief roll and polymer. For example, the carrier material thickness to structure depth ratio is 12:1 (see Example 1).

In the text below, the intention is to illustrate processes of the invention and also polymer films produced by the process of the invention, with reference to a number of examples and figures, without wishing thereby, however, to restrict the invention unnecessarily.

BRIEF DESCRIPTION OF THE DRAWINGS

The invention will now be described in greater detail with reference to the drawings, wherein.

Figure 1:
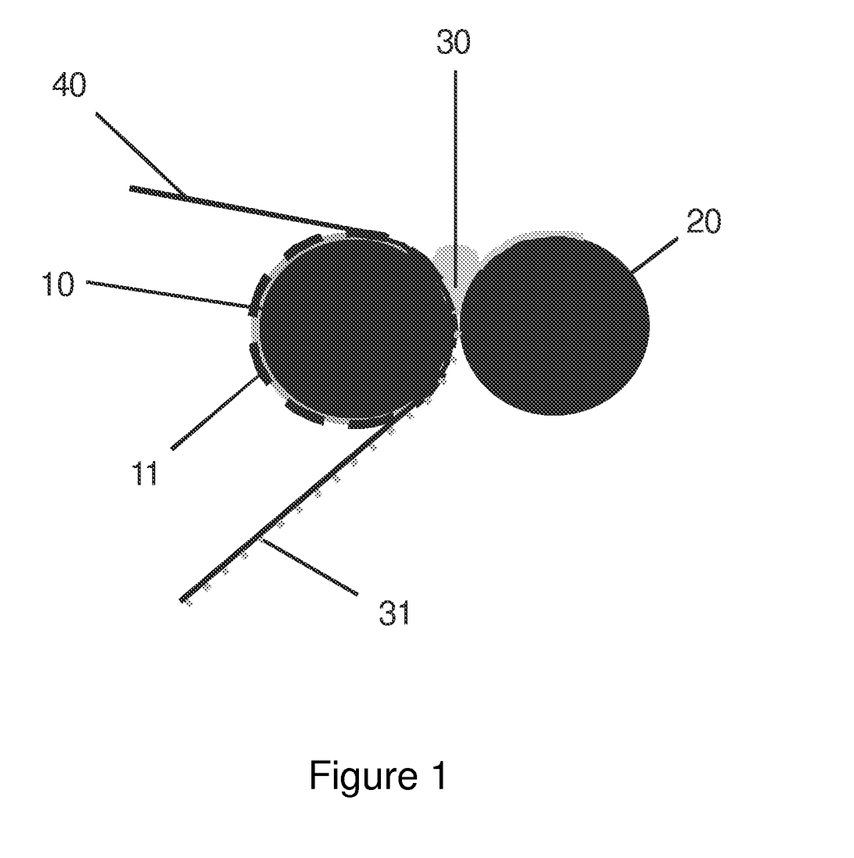
FIG. 1 shows a process of the invention for producing a nanostructured and/or microstructured self-adhesive layer.

One process of the invention is shown in FIG. 1. The unit is composed of the relief roll 10 provided with the negative relief 11, and of the nip roll 20, these two rolls together forming the roll nip and rotating preferably with the same peripheral speed.

Wrapped partly around the relief roll 10 is a web-form carrier material 40. The carrier material 40 is guided through the nip and its speed corresponds to the peripheral speed of the relief roll 11.

The self-adhesive polymer mixture is applied to the nip roll 20 and guided in the nip direction. The polymer bead 30 above the roll nip is drawn into the roll nip where it is pressed into the relief 11 of the relief roll, the carrier material 40 being located between polymer and relief roll 11.

After passage through the nip, the polymer 31 lies in layer form on the carrier material 40 and is guided away together with it.

Figure 2:
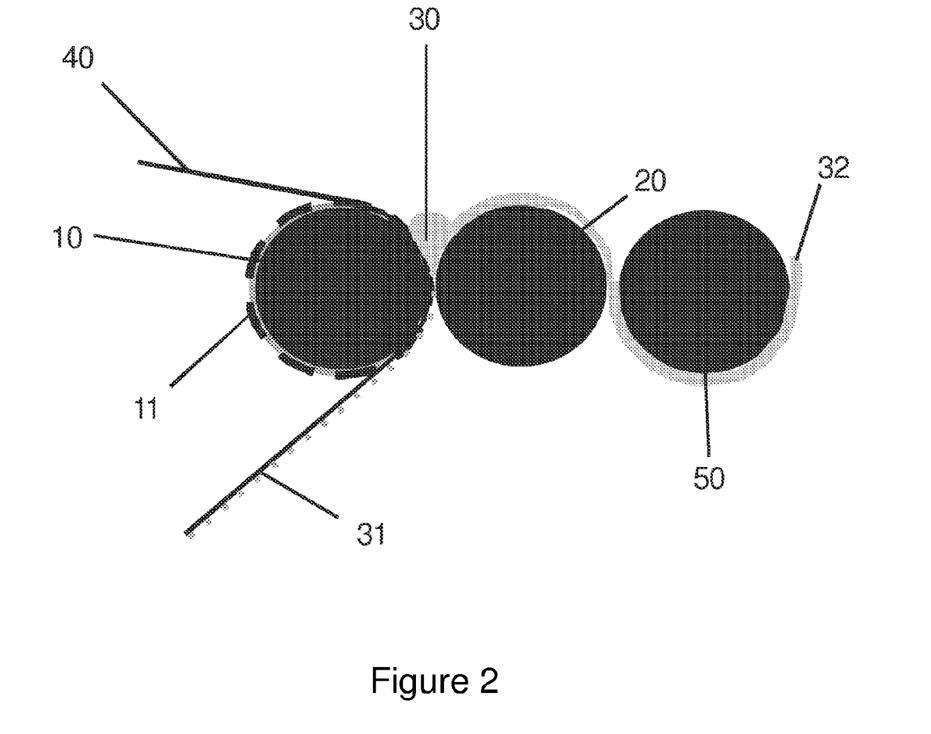
FIG. 2 shows an advantageously embodied version of the process of the invention.

FIG. 2 shows an advantageously embodied process. Together with the nip roll 20, a feed roll 50 forms a further nip, the feed roll 50 and the nip roll 20 preferably rotating with the same peripheral speed.

The self-adhesive polymer mixture 32 is first applied to the feed roll 50, guided into the further nip and, remaining on the nip roll 20 after passing through the nip, is guided into the nip between the relief roll 10 and the nip roll 20. Further processing is the same as that from FIG. 1.

Figure 3:
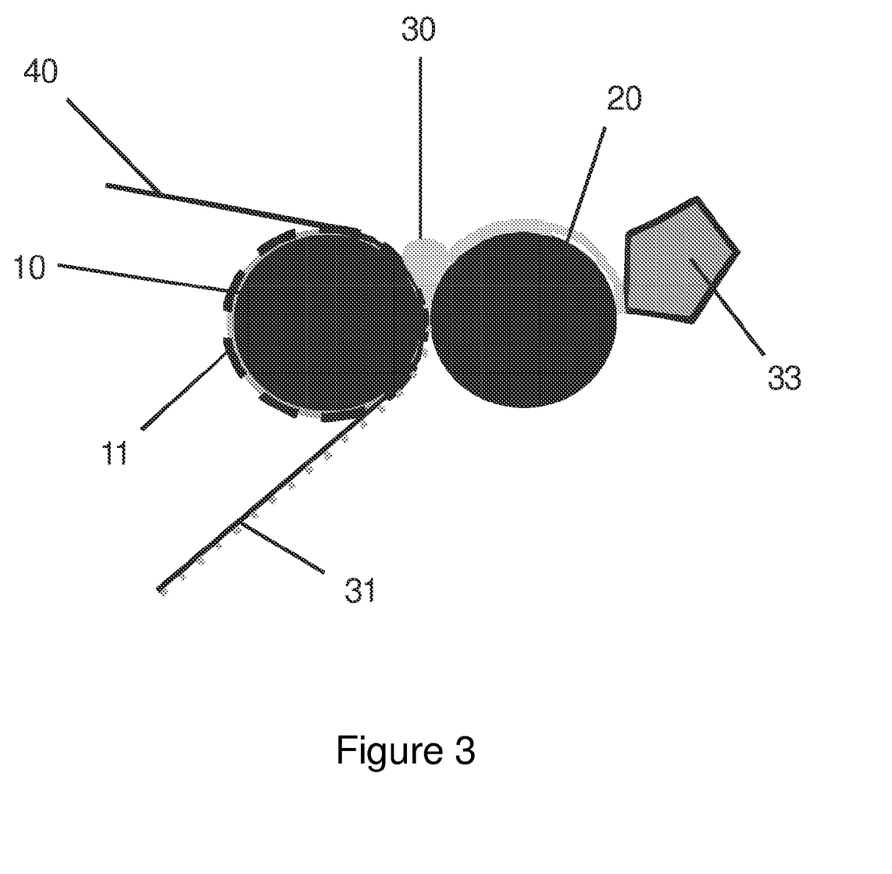
FIG. 3 shows a further advantageously embodied version of the process of the invention.

FIG. 3 represents a further advantageous version. In this case, the self-adhesive polymer mixture is applied to the nip roll by means of a die 31.

Figure 4:
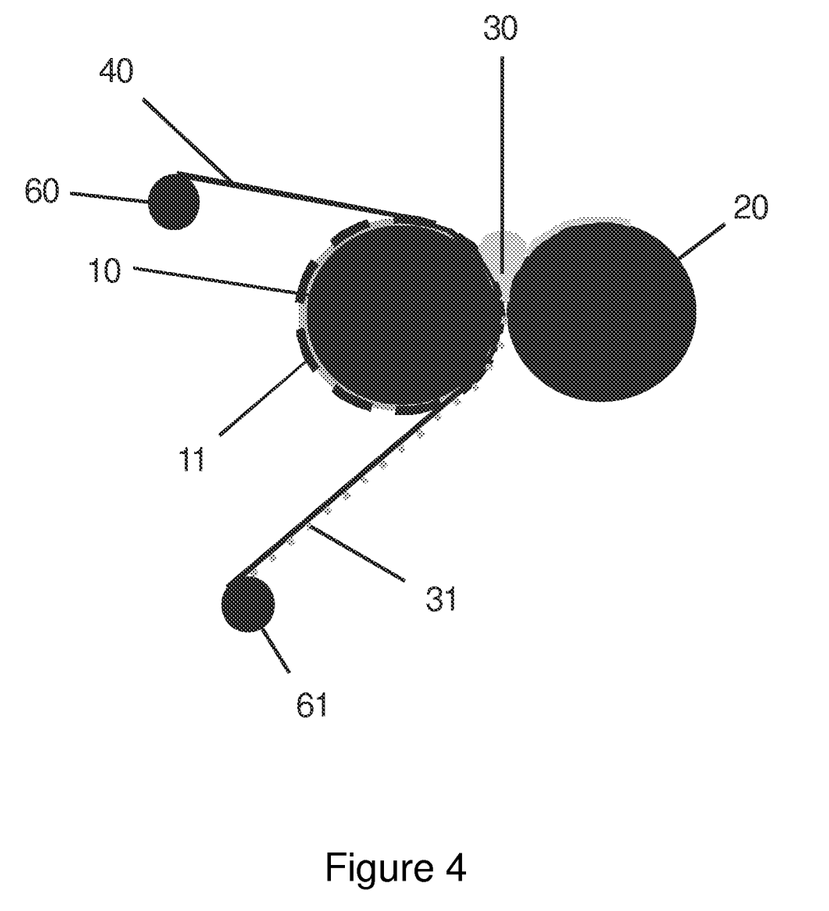
FIG. 4 shows the process of the invention according to FIG. 1 with a finite web-form carrier material.

FIG. 4 shows the process according to FIG. 1 with a finite web-form carrier material 40. The carrier material 40 is unwound in an unwinding station 60, provided in the nip with the relief-exhibiting polymer 31 and then wound up in a winding station 61.

Figure 5:
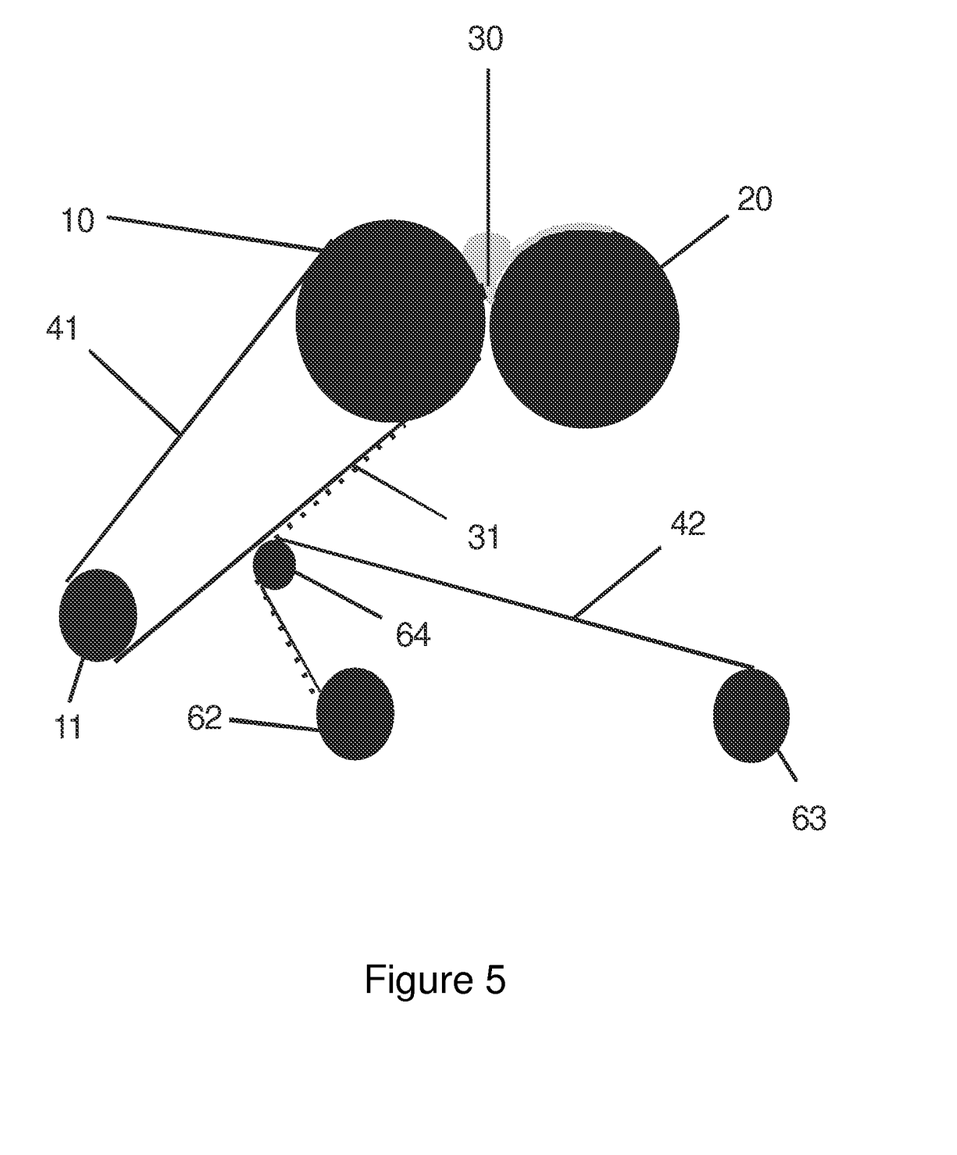
FIG. 5 shows the process of the invention according to FIG. 1 with a continuous web-form carrier material, that forms an impervious strip.

In FIG. 5 the process according to FIG. 1 is shown with a continuous web-forming carrier material 41 which forms an impervious strip. The carrier material 41 is guided via the relief roll and also via a deflecting roll 11. When the carrier material 41 in the roll nip has been provided with the self-adhesive nanostructured and/or microstructured polymer mixture 31, the carrier material 11 and also the polymer mixture 31 on it are guided in the direction of a take-off roll 64. Guided via the take-off roll 64 is a further carrier 42, which comes from an unwinding station 62. At the take-off roll 64, the carrier 42 takes over the self-adhesive layer 31 from the carrier material 41, and is subsequently wound up in a winding station 63.

EXAMPLE 1

Acrylate

The following monomeric mixtures (amounts in % by weight) are copolymerized in solution. The polymerization mixtures consist of 60% to 80% by weight of the monomer mixtures and also 20% to 40% by weight of solvents such as mineral spirit 60/95 and acetone.

In typical reaction vessels made of glass or steel (with reflux condenser, anchor stirrer, temperature measuring unit and gas inlet tube) the solutions are first freed from oxygen by flushing with nitrogen, and then heated at boiling.

The polymerization is initiated by addition of 0.1% to 0.4% by weight of a peroxide initiator or azo initiator customary for free-radical polymerization, such as dibenzoyl peroxide or azobisisobutyronitrile, for example. During the polymerization time of approximately 20 hours, depending on the increase in viscosity, there may be a number of dilutions with further solvent, so that the completed polymer solutions have a solids content of between 25% to 65% by weight.

A mass of the monomer composition is prepared that has the following constitution:

|  | % by weight |
|---|---|
| 2-ethylhexyl acrylate | 21 |
| n-butyl acrylate | 21 |
| tert-butyl acrylate | 50 |
| Acrylic acid | 8 |

The mass (composition) thus prepared, following removal of the solvent as described in EP 0 621 326 A1, is fed into a roll nip formed from a relief roll, wrapped around which there is a black PET film 12 μm thick, and by a nip roll. The relief roll is a steel roll, at a temperature of 70° C. which has been wrapped with a metal sheet, obtained by the LIGA process and formed in such a way as to produce a structure which contains a diffraction grating and/or a holographic image. The diffraction grating has a structure depth of approximately 1 μm and grid constants of between 1600 and 2100 nm. The self-adhesive polymer mixture is applied to the nip roll and guided in the direction of the nip. The polymer bead above the roll nip is drawn into the roll nip and pressed into the relief of the relief roll, the 12 μm PET film being located between self-adhesive polymer and relief roll. The two rolls are operated with a peripheral speed of 1 m/min.

After passage through the nip, the self-adhesive polymer mixture is in the form of a layer on the carrier material, and is guided away together with it. In the layer of adhesive, the self-adhesive tape produced in this way carries a negative of the diffraction grating of the relief roll. At the appropriate angle and with sufficient illumination, it is visible to the naked eye.

EXAMPLE 2

Natural Rubber

A planetary roller extruder from the company ENTEX Rust & Mitschke is used to produce the polymer mixture. The diameter of the roller cylinder is 70 mm, and its barrel length is 3 times 400 mm.

The non-thermoplastic elastomers are used in the form of pellets with average sizes of 8 mm. In order to keep the pellets free-flowing, they are talced. To produce the pellets, a cutting mill from the company Pallmann is used.

Formula

|  | Parts by weight |
|---|---|
| NR air dried sheets | 100 |
| Zinc oxide, active | 11.4 |
| Escorez ® 1202 | 43.6 |
| Dercolyte ® S115 | 20 |
| Resin 731 D ® | 50.9 |
| Ondina ® G 33 | 8 |
| Lowinox ® AH 25 | 2.5 |
| Total | 236.4 |

Tackifier Resins
   Escorez® 1202 is an aliphatic hydrocarbon resin from the manufacturer EXXON Dercolyte® S 115 is a poly-β-pinene resin from the manufacturer DRT Resin 731 D® is a disproportionated rosin from the manufacturer Abieta Plasticizer Ondina® 33 is a paraffinic white oil from Deutsche Shell AG Antioxidant Lowinox® AH 25 (2,5-di-tert-amylhydroquinone, CAS No. 79-74-3) from Great Lakes A premix is prepared from all of the formula components in a 50 kg powder mixture, and is metered into the feed section of the planetary roller extruder by way of a volumetrically operating metering unit. The thermal conditioning circuits for the central spindle and the feed section (TC1 and TC2) are water-cooled and each roller section is heated at 100° C.

The composition produced in this way is fed to a roll nip formed from a relief roll, wrapped partly with a 50 μm, double-sided siliconized PET film, and by a nip roll (T=100° C., v=1 m/min). The relief roll is a steel roll (v=0.9 m/min) heated at 120° C. and mounted on which there is a metal sheet with raised lines 20 μm deep and 2 mm wide with a distance of 2 cm, the mounting being virtually seamless and being parallel to the direction of coating. The adhesive is applied to the feed roll and guided in the direction of the nip. The polymer bead above the roll nip is drawn into the roll nip and pressed into the relief of the relief roll, the 50 μm PET film being located between the adhesive and the relief roll. After passage through the nip, the self-adhesive composition is in the form of a layer on the carrier material and is guided away together with it. The adhesive tape thus obtained has adhesive-free zones in the regions of the lines with the dimensions of the lines of the relief roll.

What is claimed is:

1. A process for producing nanostructured and/or microstructured surfaces in an adhesive layer, comprising the steps of:
    (a) providing a relief roll having a surface including a relief representing a negative of a surface structure to be produced indirectly on the adhesive layer,
    (b) providing a nip roll,
    (c) arranging the relief roll and the nip roll such as to form a nip,
    (d) rotating the relief roll and the nip roll in opposite directions,
    (e) wrapping a web-form carrier material partly around the relief roll, guiding the wrapped relief roll past the nip roll whose speed corresponds to the peripheral speed of the relief roll,
    (f) applying an adhesive polymer mixture to the rotating nip roll, and
    (g) guiding the adhesive polymer mixture into the nip such that a near-relief-roll surface of the polymer mixture is shaped according to the relief as imparted from the relief roll through the web-form carrier material onto the near-relief-roll surface of the polymer mixture, and wherein the adhesive polymer mixture does not contact the relief roll, and forms a layer on the web-form carrier material after passage through the nip, and is guided away with the web-form carrier material.

2. Process according to claim 1, further comprising the step of
    providing a feed roll for forming a further nip with the nip roll; the feed roll and the nip roll rotate with the same peripheral speed; and the self-adhesive polymer mixture is first applied to the feed roll, guided into the further nip and, remaining on the nip roll after passing through the nip, is guided into the nip between the relief roll and the nip roll.

3. Process according to claim 1, wherein the rolls are heated or cooled.

4. Process according to claim 3, wherein the rolls are heated to a temperature above the melting point of the polymer mixture used.

5. Process according to claim 1, wherein the relief is produced by sandblasting, etching, laser ablation, lithographic techniques, offset printing, electroplating techniques, LIGA, cutting, milling and/or erosion, or the relief roll is composed of a roll with a form tool wrapped around it.

6. Process according to claim 1, wherein the adhesive polymer mixture is a self-adhesive polymer mixture and the structure depth of the counter-relief produced in the self-adhesive layer is between 1 μm and 3000 μm and the structure width is between 0.5 μm and 10 cm.

7. Process according to claim 1, wherein the peripheral speed of the nip roll is more than 70% of the peripheral relief roll.

8. Process according to claim 1, wherein the adhesive polymer mixture is a self-adhesive polymer mixture and wherein
    after passage through the nip, the self-adhesive layer is taken from the carrier material and transferred to a second carrier.

9. Process according to claim 1, wherein the carrier material is an inherently impervious strip.

10. Process according to claim 1, wherein the principal polymer of the polymer mixture is selected from the group consisting of non-thermoplastic elastomers, thermoplastic elastomers and thermoplasts and blends of the said polymers, and the polymer mixture at processing temperature is in softened or melted form.

11. Process according to claim 1, wherein the polymer mixture has been blended with colorants and/or with fillers.

12. Process according to claim 11, wherein the polymer mixture is blended with one or more of $TiO_2$, carbon black and/or chalk.

13. Process according to claim 1, wherein the self-adhesive composition is filled with microballoons.

14. Process according to claim 1, wherein after structuring, the polymer is subjected to crosslinking.

15. Process according to claim 14, wherein crosslinking is performed by ionizing radiation.

* * * * *